(12) United States Patent
Lee et al.

(10) Patent No.: US 12,270,349 B2
(45) Date of Patent: Apr. 8, 2025

(54) SYSTEM AND METHOD FOR VALIDATING VALIDITY OF SENSOR USING CONTROL LIMIT

(71) Applicant: DOOSAN ENERBILITY CO., LTD., Changwon (KR)

(72) Inventors: Jung Min Lee, Seoul (KR); Jun Sang Yu, Seongnam (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 251 days.

(21) Appl. No.: 17/517,687

(22) Filed: Nov. 3, 2021

(65) Prior Publication Data

US 2022/0162998 A1 May 26, 2022

(30) Foreign Application Priority Data

Nov. 20, 2020 (KR) .................. 10-2020-0156645

(51) Int. Cl.
*F02C 9/28* (2006.01)
*F02C 7/32* (2006.01)
*G05B 23/02* (2006.01)

(52) U.S. Cl.
CPC .................. *F02C 9/28* (2013.01); *F02C 7/32* (2013.01); *G05B 23/024* (2013.01)

(58) Field of Classification Search
CPC . F02C 9/28; F02C 7/32; G05B 23/024; G05B 2219/42329; F01D 17/06;
(Continued)

(56) References Cited

U.S. PATENT DOCUMENTS 6,312,013 B1 * 11/2001 Baur .................. B60R 21/0132
701/45
6,526,358 B1 * 2/2003 Mathews, Jr. .......... G01M 3/26
702/50
(Continued)

FOREIGN PATENT DOCUMENTS

KR 10-1210729 B1 12/2012
KR 10-1599311 B1 3/2016
(Continued)

OTHER PUBLICATIONS

Jose Bernardo, Bayesian Statistics, Encyclopedia of Life Support Systems, 2003 (Year: 2003).*
(Continued)

*Primary Examiner* — Kyle R Quigley
(74) *Attorney, Agent, or Firm* — Harvest IP Law, LLP

(57) ABSTRACT

The present disclosure relates to a system and a method for validating the validity of a sensor, in particular, validating the validity of a sensor using a control limit. The method for validating the validity of a sensor using a control limit includes inferring a posterior distribution of a parameter in a Bayesian technique using a prior distribution of the parameter of sensor data and historical data of the sensor, setting a target credible interval for the posterior distribution of the parameter and setting a control line of the sensor data
(Continued)

using the set credible interval, and validating the validity of the sensor by monitoring whether the actual measurement data of the sensor deviates from the control line.

8 Claims, 9 Drawing Sheets

(58) Field of Classification Search
CPC ........ F01D 17/085; F01D 21/12; F01D 21/14; F05D 2260/80; F05D 2260/821; F05D 2270/11; F05D 2270/80; G06N 7/01
See application file for complete search history.

(56) References Cited

U.S. PATENT DOCUMENTS

| | | | | |
|---|---|---|---|---|
| 8,600,917 | B1* | 12/2013 | Schimert | G06N 20/00 706/14 |
| 2010/0206039 | A1* | 8/2010 | Kates | G08B 25/016 73/1.01 |
| 2012/0023042 | A1* | 1/2012 | Das | G06N 7/01 706/12 |
| 2012/0265037 | A1* | 10/2012 | Bohm | C12Q 1/001 600/309 |
| 2014/0107823 | A1* | 4/2014 | Huang | B29C 64/393 700/98 |
| 2015/0333998 | A1* | 11/2015 | Gopalakrishnan | H04L 41/0636 370/244 |
| 2018/0174067 | A1* | 6/2018 | Spiro | G06N 20/00 |
| 2018/0307997 | A1* | 10/2018 | Escobedo Hernández | G01M 15/02 |
| 2020/0241514 | A1 | 7/2020 | Sun | |
| 2021/0199708 | A1* | 7/2021 | Schneider | G01R 31/2621 |

FOREIGN PATENT DOCUMENTS

| | | |
|---|---|---|
| KR | 10-1695797 B1 | 1/2017 |
| KR | 101866491 B1 | 4/2018 |
| WO | 0218879 A1 | 3/2002 |

OTHER PUBLICATIONS

Design of inferential sensors in the process industry_A review of Bayesian methods.
Perform Bayesian Inference.
Real Time Intelligent Sensor Validation.

\* cited by examiner

[FIG. 1]
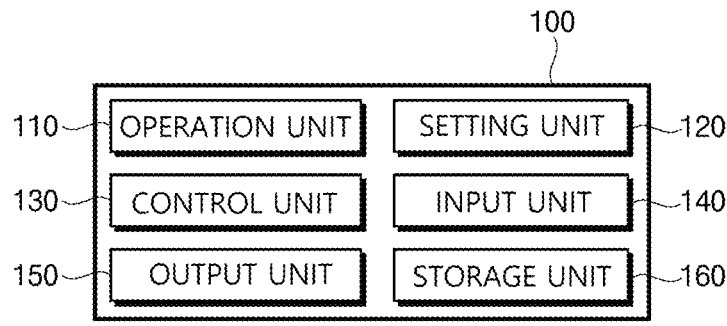
[FIG. 2]
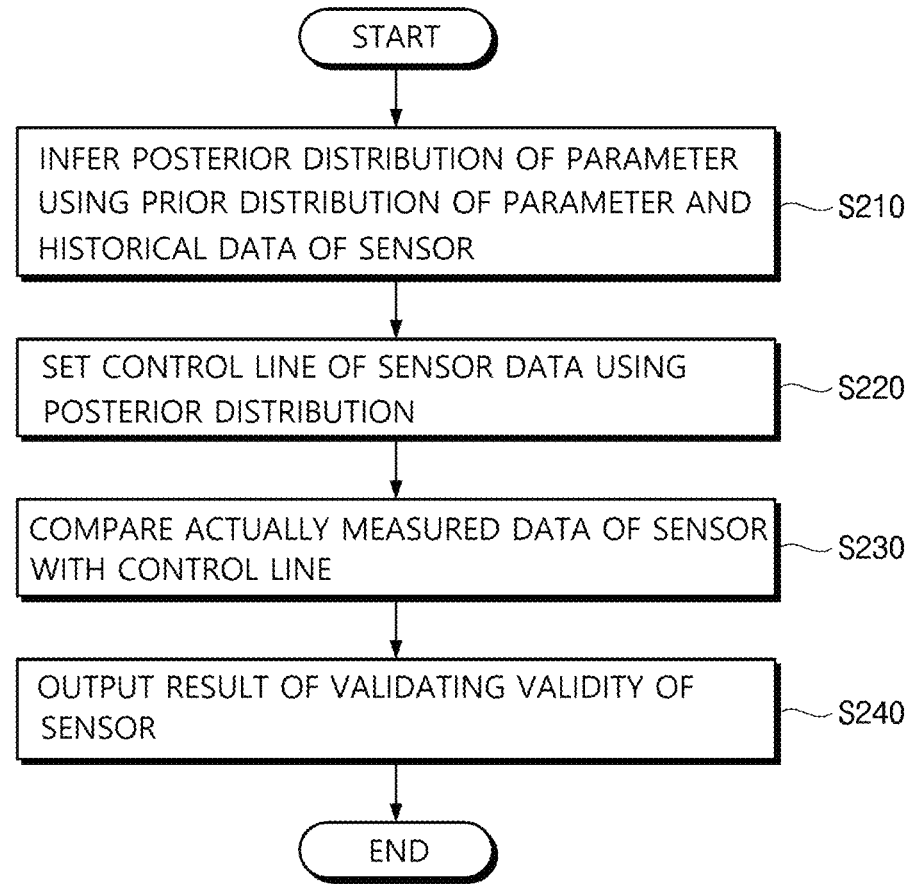

[FIG. 3]
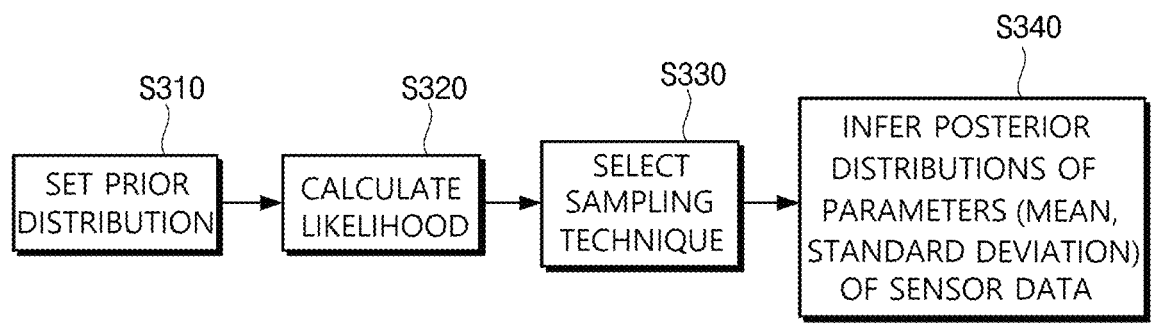
[FIG. 4A]
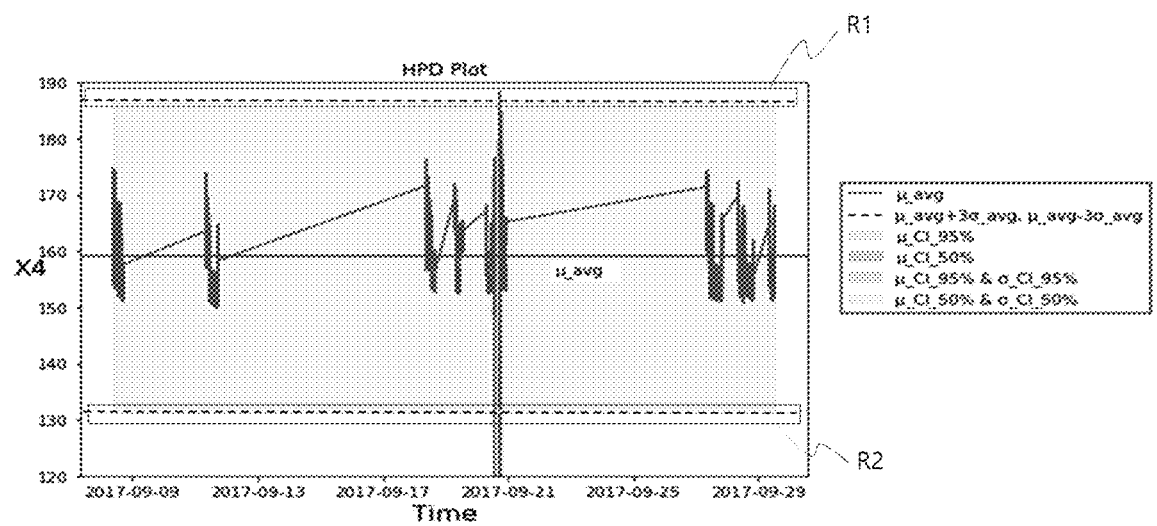

[FIG. 4B]
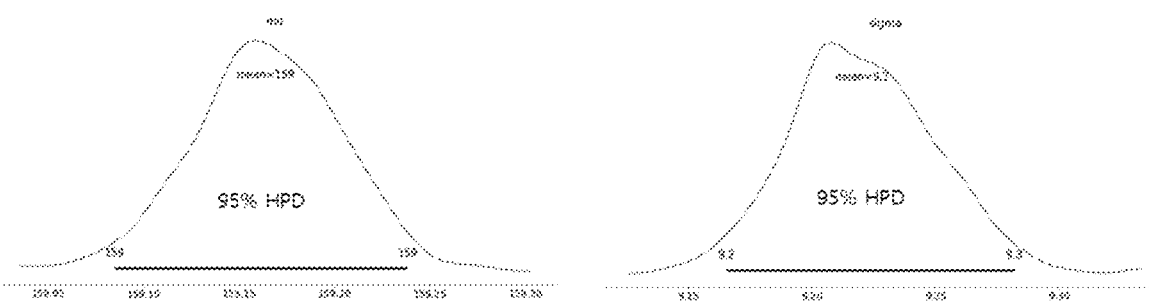
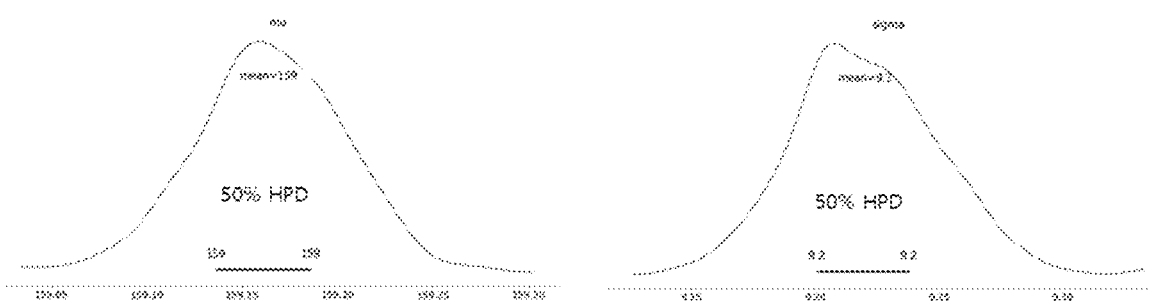
(a) POSTERIOR DISTRIBUTION OF MEAN
(b) POSTERIOR DISTRIBUTION OF STANDARD DEVIATION

[FIG. 4C]
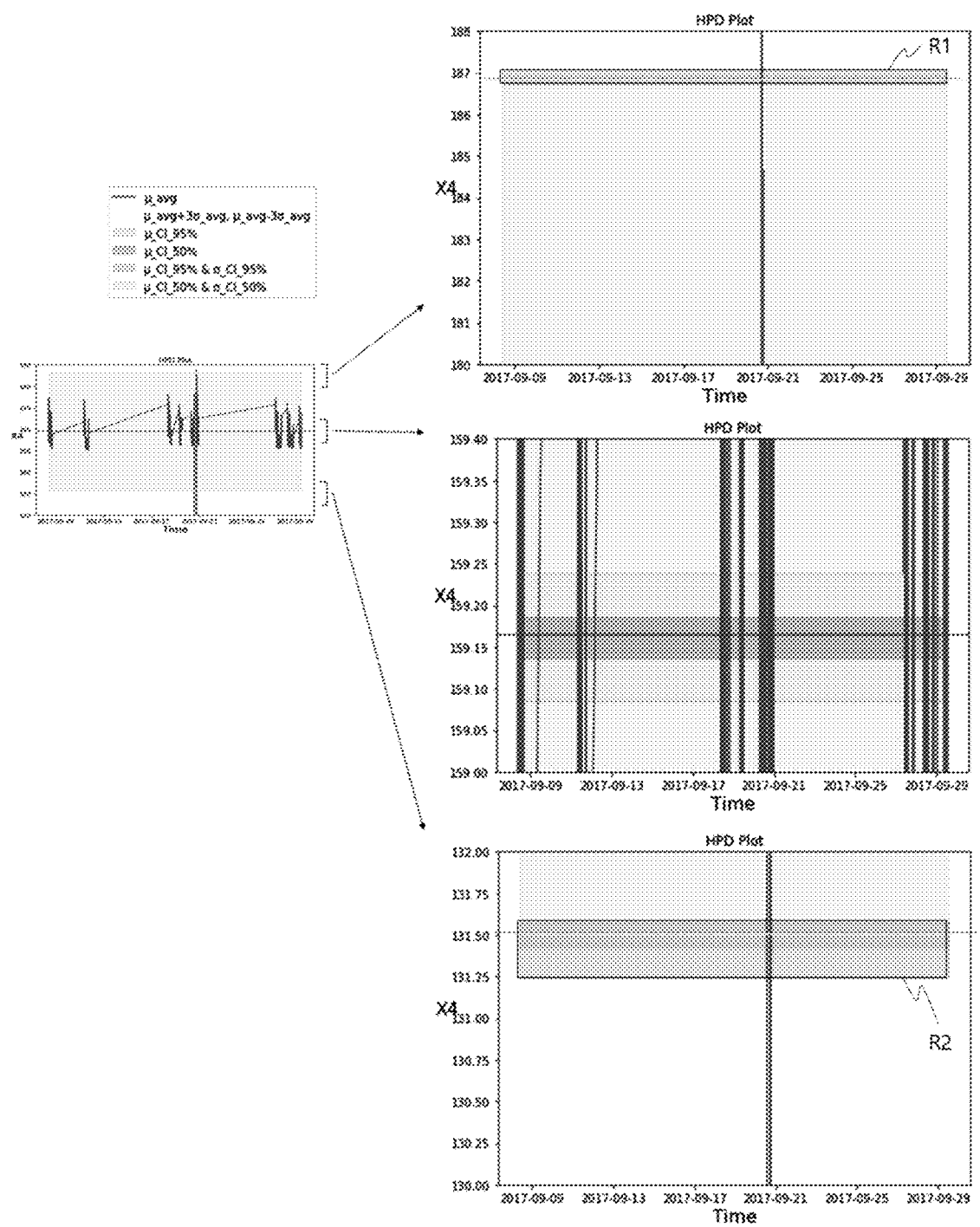

[FIG. 5]
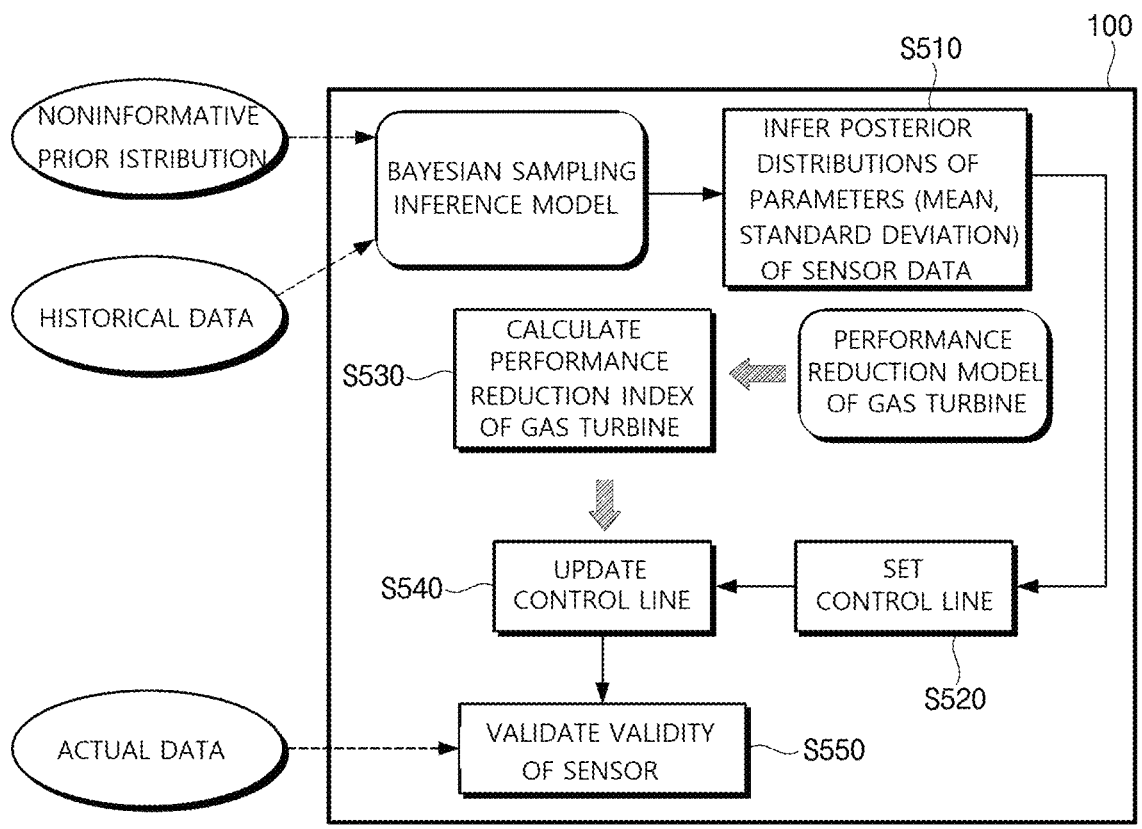

[FIG. 6]
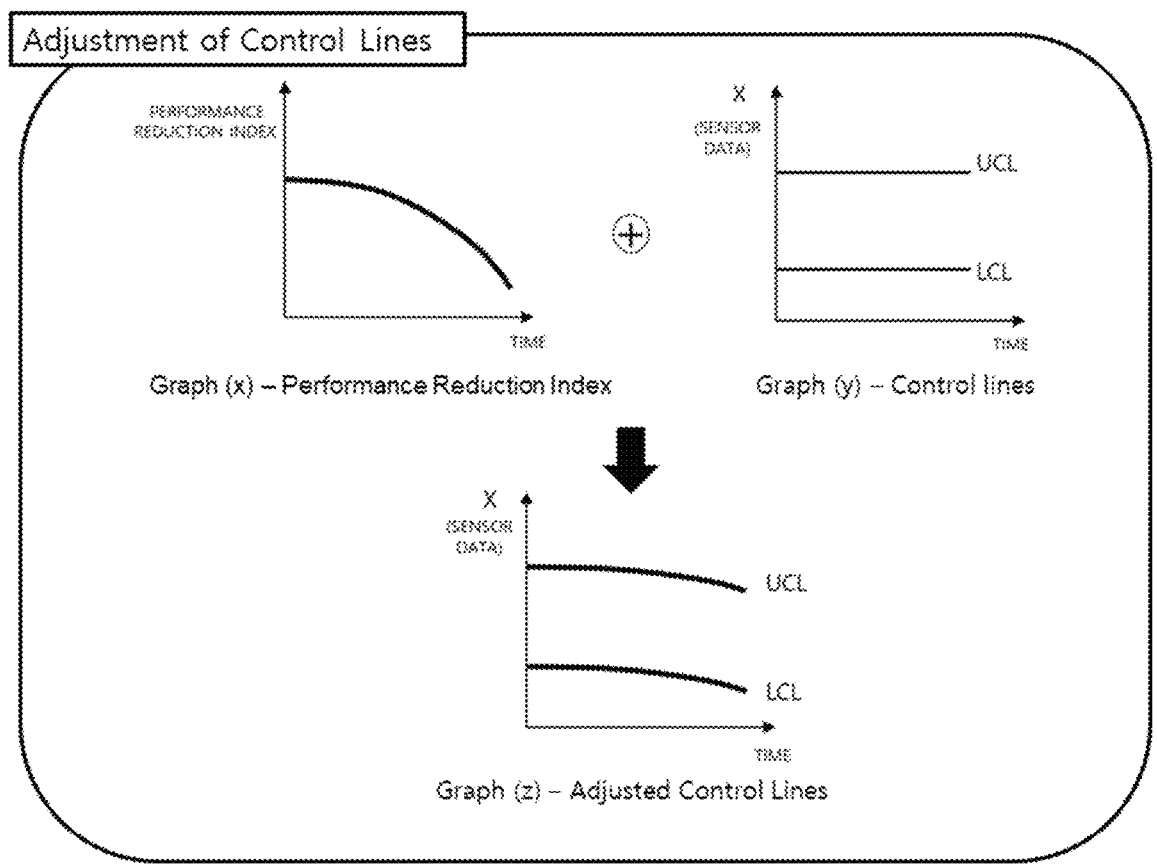

[FIG. 7A]
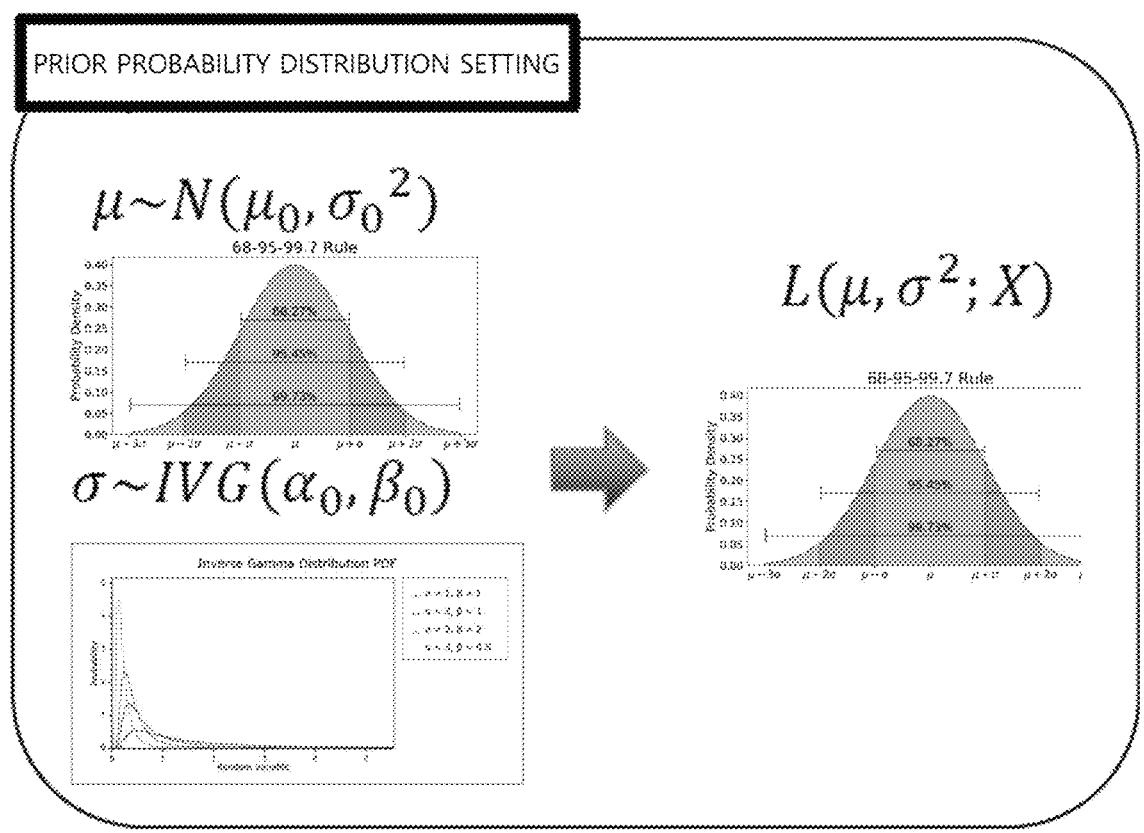

[FIG. 7B]
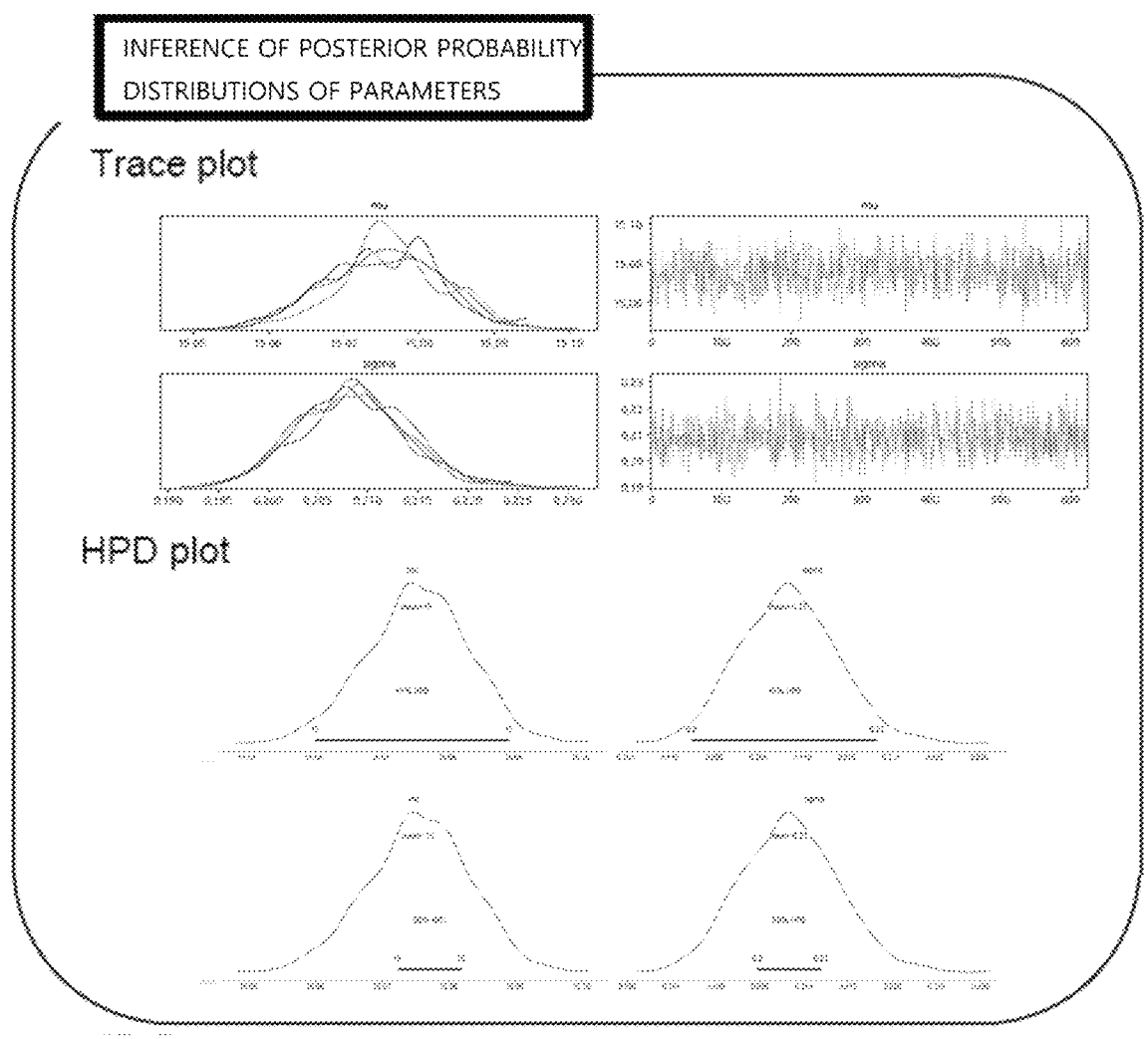

[FIG. 7C]
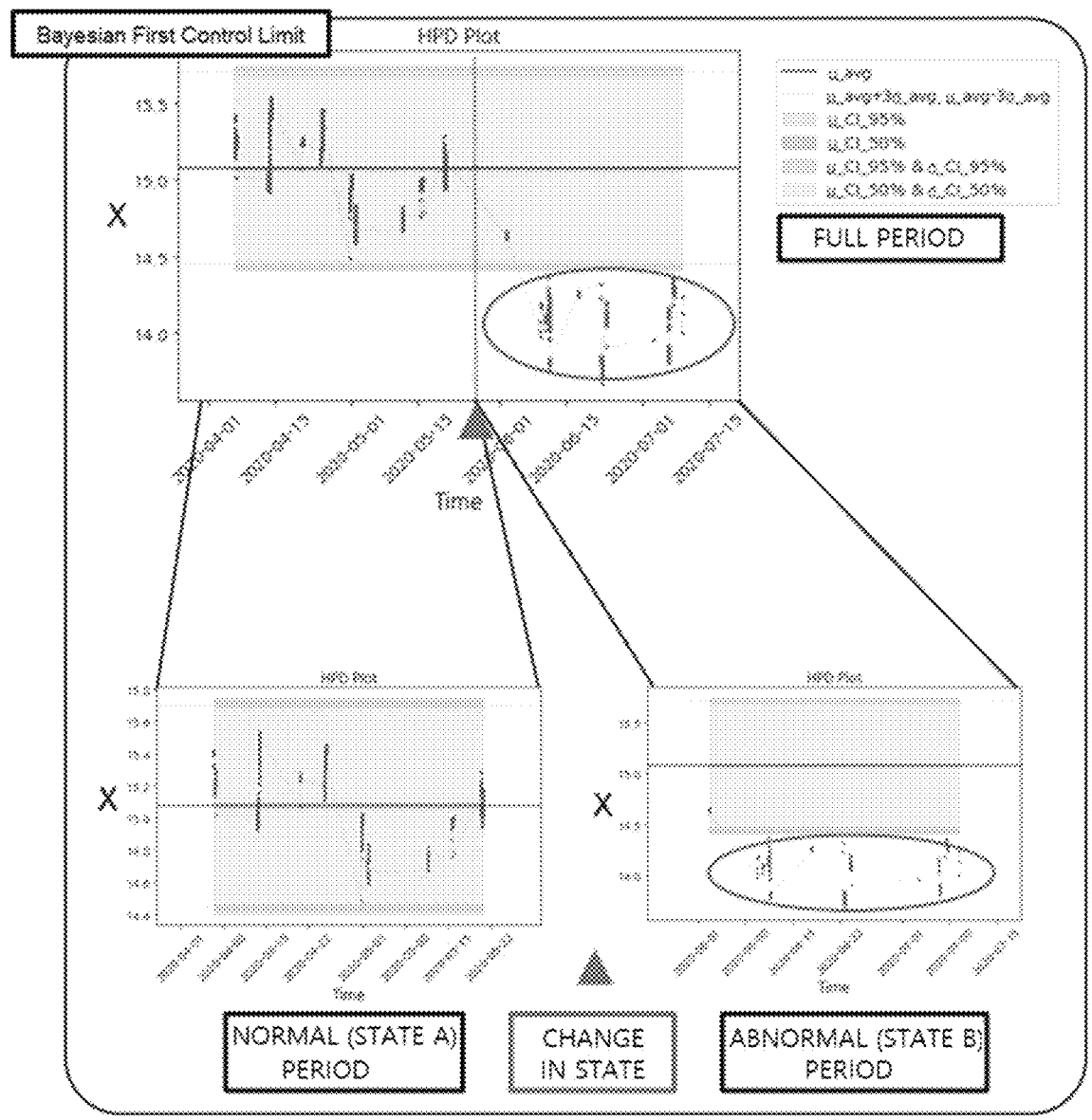

SYSTEM AND METHOD FOR VALIDATING VALIDITY OF SENSOR USING CONTROL LIMIT

CROSS-REFERENCE TO RELATED APPLICATION

This application claims priority to Korean Patent Application No. 10-2020-0156645, filed on Nov. 20, 2020, the disclosure of which is incorporated by reference herein in its entirety.

BACKGROUND

Field

Exemplary embodiments of the present disclosure relate to a system and a method for validating the validity of a sensor, in particular, to a system and a method for validating the validity of a sensor using a control limit.

Description of the Related Art

Generally, performance degradation or failure may be caused by a lifetime limit, external shock, etc. in a sensor. When there occurs a problem in the sensor, accuracy and reliability of measured data are reduced and therefore, replacement or repair of the sensor is required.

Further, the reduction in reliability of the sensor data may mean that the sensor itself is not valid any more. Therefore, to ensure the continuity of a facility in which the sensor is mounted and operated, there is a need for a process of validating whether the sensor itself is valid through the real-time monitoring and analysis of the sensor data.

In this regard, as the related art, a technique of validating the validity of the sensor using an algorithm based on the rule, such as a fuzzy logic, has been proposed. However, since the conventional technique has set a control limit based on sample data of one sensor, there is a problem that the control limit is valid only for the corresponding sensor and it is difficult to generalize and apply the same control limit to all sensors belonging to the same population.

SUMMARY

An object of the present disclosure is to provide a system and a method for validating the validity of a sensor, which can validate the validity of a sensor more reliably by comparing actual sensor data with a control limit set statistically.

An aspect of an exemplary embodiment provides a method for validating the validity of a sensor including inferring a posterior distribution of a parameter in a Bayesian technique using a prior distribution of the parameter of sensor data and historical data of the sensor, setting a target credible interval for the posterior distribution of the parameter and setting a control line of the sensor data using the set target credible interval, and validating the validity of the sensor by monitoring whether actual measurement data of the sensor deviates the control line.

Further, the method may further include modifying the control line by applying a performance reduction index of a facility in which the sensor is installed.

Further, the sensor may be installed in a gas turbine.

Further, the sensor may include at least one of a temperature sensor and a rotation speed sensor that are configured to measure a temperature and a rotation speed of the gas turbine.

Further, the setting of the control line may include setting the credible interval by applying an HPD value based on a setting percentage with respect to a median value of the posterior distribution of the parameter, and setting the control line of the sensor data using parameter values corresponding to lower and upper boundary values of the target credible interval.

Further, the parameter may include a mean and a standard deviation.

Further, the setting of the control line may include determining upper and lower control lines for the sensor data, respectively, from the result of combining the parameter values corresponding to the lower and upper boundary values ($\mu_1$, $\mu_2$) of the target credible interval applied to the posterior distribution of the mean and the parameter values corresponding to the lower and upper boundary values ($\sigma_1$, $\sigma_2$) of the target credible interval applied to the posterior distribution of the standard deviation.

Further, the setting of the control line may include determining the lower control line within a lower control limit range generated by combining the $\mu_1$ ($\mu_1 < \mu_2$) and the $\sigma_i$ (($\mu_1 - 3\sigma_i$) (i=1, 2; $\sigma_1 < \sigma_2$)), and determine the upper control line within an upper control limit range generated by combining the $\mu_2$ and the $\sigma_i$ (($\mu_2 + 3\sigma_i$)).

Further, the validating of the validity of the sensor may include determining that the sensor is valid if the actual measurement data of the sensor is a value between the upper control line and the lower control line, and determine that the sensor is not valid if it is a value higher than the upper control line or lower than the lower control line.

Further, the method may further include outputting the result of validating the validity of the sensor through at least one means of a display and a speaker.

Further, another aspect of the exemplary embodiment provides a system for validating the validity of a sensor for determining whether the sensor is normal, the system including an operation unit configured to infer a posterior distribution of a parameter in a Bayesian technique using a prior distribution of the parameter of sensor data and historical data of the sensor, a setting unit configured to set a credible interval for the posterior distribution of the parameter and to set a control line of the sensor data using the credible interval, and a control unit configured to validate the validity of the sensor by monitoring whether the actual measurement data of the sensor deviates the control line.

Further, the setting unit may modify the control line by applying a performance reduction index of a facility in which the sensor is installed.

Further, the sensor may be installed in a gas turbine.

Further, the sensor may include at least one of a temperature sensor and a rotation speed sensor that are configured to measure a temperature and a rotation speed of the gas turbine.

Further, the setting unit may set the credible interval by applying an HPD value based on a setting percentage with respect to a median value of the posterior distribution of the parameter, and set the control line of the sensor data using parameter values corresponding to lower and upper boundary values of the credible interval.

Further, the parameter may include a mean and a standard deviation.

Further, the setting unit may determine upper and lower control lines for the sensor data, respectively, from the result of combining the parameter values corresponding to the lower and upper boundary values ($\mu_1$, $\mu_2$) of the credible interval applied to the posterior distribution of the mean and the parameter values corresponding to the lower and upper boundary values ($\sigma_1$, $\sigma_2$) of the credible interval applied to the posterior distribution of the standard deviation.

Further, the setting unit can determine the lower control line within a lower control limit range generated by combining the $\mu_1$ ($\mu_1 < \mu_2$) and the $\sigma_i$ (($\mu_1 - 3\sigma_i$) (i=1, 2; $\sigma_1 < \sigma_2$)), and determine the upper control line within an upper control limit range generated by combining the $\mu_2$ and the $\sigma_i$ (($\mu_2 + 3\sigma_i$)).

Further, the control unit may determine that the sensor is valid if the actual measurement data of the sensor is a value between the upper control line and the lower control line, and determine that the sensor is not valid if it is a value higher than the upper control line or lower than the lower control line.

Further, the system may further include an output unit configured to output the result of validating the validity of the sensor through at least one means of a display and a speaker.

According to the present disclosure, it is possible to validate the validity of the sensor more reliably by comparing the control limit set based on Bayesian inference with the actual sensor data in real time.

Further, according to the present disclosure, it is possible to modify the control limit in consideration of the performance reduction factor measured in the facility in which the sensor is installed, thereby solving a risk of incorrect determination that the sensor is invalid when the distortion and fluctuation of the sensor data are caused by the reduction in performance of the facility while the sensor itself is reliable and valid.

BRIEF DESCRIPTION OF THE DRAWINGS

The above and other aspects will become more apparent from the following description of the exemplary embodiments with reference to the accompanying drawings, in which:

FIG. 1 is a diagram showing a system for validating the validity of a sensor according to an exemplary embodiment of the present disclosure.

FIG. 2 is a diagram explaining a method for validating the validity according to an embodiment of the present disclosure.

FIG. 3 is a diagram briefly showing a process of calculating posterior distributions from prior distributions of parameters according to an exemplary embodiment of the present disclosure.

FIGS. 4A to 4C are diagrams exemplarily showing the posterior distributions of the parameters obtained according to the exemplary embodiment of the present disclosure and control lines set therefrom.

FIG. 5 is a diagram explaining a method of validating the validity of the sensor that combines a Bayesian inference model and a performance reduction model according to an exemplary embodiment of the present disclosure.

FIG. 6 is a diagram explaining an example of updating the control line in combination with the performance reduction model according to the exemplary embodiment of the present disclosure.

FIGS. 7A to 7C are diagrams showing the results of testing the validity validation of the sensor through the technique according to an exemplary embodiment of the present disclosure.

DETAILED DESCRIPTION

Then, various embodiments and various modifications will be described in detail with reference to the accompanying drawings such that those skilled in the art to which the present disclosure pertains can easily carry out the exemplary embodiment of the present disclosure. However, the various embodiments can be implemented in various different forms and is not limited to the exemplary embodiments described herein. The present invention should be interpreted to include all modifications, equivalents, and alternatives of the embodiments included within the spirit and scope disclosed herein.

Exemplary embodiments will be described in detail with reference to the accompanying drawings. It should be noted that like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art. For the same reason, some components may be exaggerated, omitted, or schematically illustrated in the accompanying drawings.

Throughout the specification, when a certain portion is "connected" to another portion, this includes not only a case of being "directly connected" but also a case of being "electrically connected" with other elements interposed therebetween. Also, the use of the terms "a" and "an" and "the" and similar references in the context of describing the embodiments are to be construed to cover both the singular and the plural, unless otherwise indicated herein or clearly contradicted by context. Further, terms such as "includes," "comprises," and "have/has" should be construed as designating that there are such features, integers, steps, operations, elements, components, and/or combinations thereof, not to exclude the presence or possibility of adding of one or more of other features, integers, steps, operations, elements, components, and/or combinations thereof.

Exemplary embodiments of the present disclosure relate to techniques of validating the validity of a sensor, in particular, validating the validity of a sensor using a control limit. An exemplary embodiment infers probability distributions of parameters (such as a mean and a standard deviation) for the population of the corresponding sensor from a sample of sensor data through a Bayesian sampling technique and sets control lines of the sensor based on the inferred results to be used for validating the validity of a sensor.

A sensor to be validated for validity according to the present disclosure may include various sensing equipment, such as a sensor module and a sensor device, installed in a facility in a general factory or site to measure factors (e.g., a temperature of the facility or a rotation speed of a turbine) related to the corresponding facility.

Hereinafter, an exemplary embodiment of validating the validity of a sensor is described in reference to a sensor installed in a gas turbine used to measure relevant factors upon operation of the gas turbine. Of course, an embodiment of the present disclosure may be applied to various facilities, factories, and machines, not limited to gas turbines.

FIG. 1 is a diagram showing a system for validating the validity of a sensor according to an exemplary embodiment of the present disclosure.

Referring to FIGS. 1 and 2, a system for validating the validity of a sensor 100 according to an exemplary embodiment of the present disclosure may include an operation unit 110, a setting unit 120, and a control unit 130. Each unit 110, 120, and 130 may be implemented in one or more processors according to an embodiment. According to another embodiment, the system 100 may further include a storage unit 160. The storage unit 160 may be implemented in a memory.

According to yet another embodiment, the system 100 may further include an input unit 140 and an output unit 150. An operation of each unit 110, 120, 140, 150, 160 and a data flow control between the respective units may be performed by the control unit 130.

First, the operation unit 110 infers posterior distributions of parameters using prior distributions for the parameters of sensor data and historical data of a sensor (S210).

Understandably, various prior distributions may be used as the prior distribution for the parameters in inferring the posterior distribution. For example, a noninformative prior distribution (e.g., uniform distribution or normal distribution) may be used, and the posterior distribution previously generated in the past may also be used. The noninformative prior distribution may be used when there is no prior information about the distribution of the parameter. In explaining an exemplary embodiment of the present disclosure, the noninformative prior distribution is used as an example.

According to an exemplary embodiment of the present disclosure, the parameter may include at least one of the mean and the standard deviation of sensor data. Therefore, the operation unit 110 may obtain a posterior distribution of the mean of the sensor data and/or a posterior distribution of the standard deviation of the sensor data.

According to an embodiment, the posterior distribution of the mean may be obtained from any prior distribution (e.g., uniform distribution or normal distribution) of the mean of the sensor data and the historical measured values of the sensor, and the posterior distribution of the standard deviation may be also obtained from any prior distribution (e.g., uniform distribution or normal distribution) of the standard deviation of the sensor data and the historical measured values of the sensor. According to an embodiment, for the inference, Bayesian inference may be applied. However, various other inference methods may be used known to a person in this field.

In other words, according to an embodiment, the operation unit 110 may infer the posterior distributions of the parameters from the prior distributions of the parameters and the historical measured values of the sensor using an inference technique such as the Bayesian inference technique.

FIG. 3 is a diagram schematically showing a process of calculating the posterior distributions from the prior distributions of the parameters according to an exemplary embodiment of the present disclosure.

First, the setting unit 120 sets the prior distributions of the parameters (S310). According to an embodiment, the prior distributions may be a preset distribution. If there is no information about the prior distribution of the parameter, the noninformative prior distribution (e.g., normal distribution) may be set as the prior distribution of the parameter and used.

Then, the setting unit 120 calculates a likelihood, also referred to as a likelihood function, using historical data of the sensor (S320). The likelihood calculation is well known to person in the skilled in this field and therefore, a detailed description thereof will be omitted.

Next, the setting unit 120 selects a sampling technique for inferring the posterior distribution (S330). While various sampling technique may be used, a Bayesian sampling technique, such as Metropolis-Hastings and Gibbs Sampler may be selectively used.

Then, the setting unit 120 obtains the posterior distribution P(H|D) of the parameter using an inference technique, such as the Bayesian sampling inference technique. In doing so, according to an embodiment, the setting unit 120 may obtain the posterior distribution P(H|D) based on Equation 1 below using a product of the prior distribution P(H) of the parameter and the likelihood P(D|H) (S340).

$$P(H \mid D) = \frac{P(D \mid H) P(H)}{P(D)} \quad \text{Equation 1}$$

Here, the P(H) refers to the prior distribution (prior knowledge) of the parameter, that is, the prior probability. The P(D|H) refers to the probability of the data (D) given hypothesis (H), which means the possibility of hypothesis (H) to support data (D) as the likelihood. The P(H|D) refers to the posterior probability updated through the data (D). The P(D) refers to the probability of the data (D) and a setting constant value is applied.

It may be seen that the posterior distribution of the parameter is determined using a product of the prior distribution of the parameter and the likelihood (likelihood function) from Equation 1 in the Bayesian sampling inference model.

It is worth to note that in case of using the Bayesian inference technique, there is the advantage capable of inferring the posterior distribution (i.e., probability distribution) for sensing data of sensors belonging to the entire population, not just the posterior distribution for specific sample data.

Referring to FIG. 2, according to an embodiment of the present disclosure, the system 100 may set a probabilistic control line of the sensor data, that is, the control line representing the property of the population based on the inferred posterior distribution of the parameter. And the system 100 may reliably validate whether the sensor is valid in real time by a method of comparing the actually measured sensor data with the probabilistic control line/region. The probabilistic control line may be referred to as probabilistic control region, statistical control line, or statistical control region.

According to an embodiment, the setting unit 120 sets a target credible interval for the inferred posterior distribution of the parameter, and sets the control line of the sensor data using the set credible interval (S220).

Generally, the credible interval is defined as follows, and in other words, when a subset $C \subset \Theta$ of a parameter space $\Theta$ (i.e., $\Theta$ is a set of $\theta$) satisfies $P(\theta \in C|y) \geq 1-\alpha$ with respect to a significance level $\alpha$, C is referred to as the credible interval of $100(1-\alpha)\%$ for $\theta$ when data y are given.

The control line is a control threshold used for determining the validity of the sensor. The system 100 may compare the actually measured sensor data with the control line to find whether the actually measured sensor data deviate from the control line. The system 100 may further determine that there is a problem in the sensor itself or that the sensor is not valid based on such comparison or finding.

According to an embodiment, the setting unit 120 may store information about the set control line in the storage unit 160 and provide the information to the control unit 130. The data measured by the sensor may be input to the input unit 140 and the input unit 140 may provide the data to the control unit 130 to be used for validating the validity. The input unit 140 may be connected to the sensor via a wired and/or wireless network through a communication unit (not shown) to receive the sensor data.

According an embodiment, the control unit 130 validates the validity of the sensor in real time by comparing the actual measurement data of the sensor with the control line (S230). The sensor may provide the measured data via the wired and/or wireless network at a set cycle to the input unit 140. The control unit 130 compares the control line stored in the storage unit 160 with the received sensor data in real time and validates whether the sensor is valid or not valid depending upon the comparison result.

According to an embodiment, the control unit 130 monitors whether the actual measurement data of the sensor deviates from the control line to validate whether the sensor is valid. The control unit 130 may determine that the sensor is not valid if the actual measurement data exceeds the control line, and conversely, may determine that the sensor is valid if the actual measurement data does not deviate from the control line and exists within a normal range.

According to an embodiment, the control unit 130 outputs and provides the aforementioned result of validating the validity in real time through the output unit 150 (S240). Here, the output unit 150 may audiovisually provide the result of validating the validity, including means, such as a display and/or a speaker.

Next, a method for setting the control line of the sensor data from the posterior distribution of the parameter according to an embodiment will be described in detail.

According to an embodiment, the setting unit 120 sets a credible interval based on a setting percentage (e.g., 95%, 50%) with respect to the posterior distribution of the parameter. Then the setting unit 120 sets the control line of the sensor data using a boundary parameter value corresponding to the credible interval of this setting percentage. Here, the percentage (%) is related to a value of the highest posterior density (HPD), and may be changed depending upon the situation or by an input to change the percentage.

According to an embodiment, the setting unit 120 may the probabilistic control line using the posterior distribution of the parameter and the HPD statistic. Since the parameter may include a mean and a standard deviation, the setting unit 120 may set the credible interval of a predetermined percentage (%) with respect to the posterior distribution of each of the mean and the standard deviation and set the control line of the sensor data by combining parameter values corresponding to both edge points, also may be referred to as both boundaries, of each credible interval.

In particulars, according to an embodiment, the setting unit 120 may set the credible interval by applying the HPD value having the setting percentage (e.g., 95%, 50%) with respect to a median value of the posterior distribution of the parameter. Also, the setting unit 120 may set the control line of the sensor data using the boundary parameter values corresponding to both boundaries of the credible interval within the posterior distribution.

According to an embodiment, the setting unit 120 may set upper/lower (i.e., upper and/or lower) control lines for the sensor data, respectively, by combining the boundary values of the credible intervals applied to the posterior distributions for two parameters, which include the mean and the standard deviation.

In other words, the setting unit 120 may determine the upper and/or lower control lines for the sensor data, respectively, using the result of combining parameter values corresponding to the lower and upper boundary values ($\mu_1$, $\mu_2$) obtained in the credible interval applied to the posterior distribution of the mean, and parameter values corresponding to the lower and upper boundary values ($\sigma_1$, $\sigma_2$) of the credible interval applied to the posterior distribution of the standard deviation.

In case of applying the credible interval of 95%, the $\mu_1$ and $\mu_2$ in the posterior distribution of the mean are parameter values corresponding to 2.5% HPD and 97.5% HPD that are the lower and upper boundary values of the credible interval, respectively. Likewise, the $\sigma_1$ and $\sigma_2$ in the posterior distribution of the standard deviation are parameter values corresponding to 2.5% HPD and 97.5% HPD that are lower and upper boundary values of the credible interval, respectively.

According to an embodiment of the present disclosure, it may be determined that the sensor is valid if a value sensed or measured is between the upper control line and the lower control line, and it may be determined that the sensor is not valid if a value sensed or measured is higher than the upper control line or lower than the lower control line.

According to the exemplary embodiment of the present disclosure, the upper and lower control lines may be set based on a 6 sigma control technique.

Specifically, according an embodiment, the setting unit 120 may generate a lower control limit range of $\mu_1 - 3\sigma_1$ to $\mu_1 - 3\sigma_2$ range by combining the $\mu_1$ ($\mu_1 < \mu_2$) and the $\sigma_i$ ($\mu_1 - 3\sigma_i$) (i=1, 2; $\sigma_1 < \sigma_2$), and set the lower control line within the corresponding range. For example, the lower control line may be set as the '$\mu_1 - 3\sigma_2$' value that is the minimum value in the R2 region of FIG. 4A, which is to be described later in detail. It may be determined that the sensor is not valid if the sensed or measured sensor data is lower than such lower control line.

Similarly, according to an embodiment, the setting unit 120 may generate an upper control limit range of a $\mu_2 + 3\sigma_1$ to '$\mu_2 + 3\sigma_2$' range from the result of combining the $\mu_2$ and $\sigma_i$ ($\mu_2 + 3\sigma_i$) and set the upper control line within the corresponding range. For example, the upper control line may be set as the '$\mu_2 + 3\sigma_2$' value that is the maximum in the R1 region of FIG. 4A. It may be determined that the sensor is not valid if the sensed or measured sensor data is higher than the upper control line.

FIGS. 4A to 4C are diagrams exemplarily showing the posterior distributions of the parameters and the control lines set in the sensor data therefrom according to an exemplary embodiment of the present disclosure.

FIG. 4A shows an exemplary diagram of the actual sensor data measured for a sensor over time. FIG. 4B shows the posterior distributions of the parameters (the mean and the standard deviation) previously obtained for the corresponding sensor.

FIG. 4C is an enlarged diagram of the control lines applied to the sensor data of FIG. 4A. The control lines are derived using the results of FIG. 4B that are the posterior distributions of the parameters. Therefore, it is possible to validate the validity of the sensor in real time depending upon whether the actually measured sensor data of FIG. 4A deviates from the lower and upper control lines.

FIG. 4B shows the probability distributions of the respective parameters (the mean and the standard deviation) inferred by the Bayesian technique according to an embodiment, in which the probability distribution of the mean is depicted on the left and the probability distribution of the standard deviation is depicted on the right. In other words, they correspond to the probability distribution of the mean and the probability distribution of the standard deviation that are expected from the corresponding population.

In FIG. 4B, the figures at the top indicate the credible interval of 95% HPD in the distribution of the corresponding parameter and the figures at the bottom indicate the credible interval of 50% HPD therein. The lower the credible interval is set, the narrower an interval between the upper and lower control lines is.

The green line shown in the center of FIG. 4A shows the median value on the posterior distribution of the mean in FIG. 4B. The upper control limit range (R1) and the lower control limit range (R2) set above and below with respect to the green line are obtained using the two figures at the top using the credible interval of 95% in FIG. 4B.

Further, the dotted lines in the R1 and the R2 are limit values obtained by combining the median values on the posterior distributions for the respective parameters (the mean and the standard deviation) of FIG. 4B in the 6 sigma technique. In other words, when the median value on the posterior distribution of the mean is named μ, and the median value on the posterior distribution of the standard deviation is named σ, the dotted line in the R1 corresponds to the μ+3σ value and the dotted line in the R2 corresponds to the μ−3σ value.

FIG. 4C is an enlarged diagram of FIG. 4A, in which the figures at the top right and the bottom right show the upper control limit region and the lower control limit region obtained through the two figures using the credible interval of 95% at the top in FIG. 4B, whereas, the figure at the middle right shows a data range belonging to the credible interval of 95% and a data range belonging to the credible interval of 50% in the posterior distribution of the mean in FIG. 4B.

Further, according to an exemplary embodiment of the present disclosure, the upper and lower control lines may be additionally set in the same manner using the posterior distributions at the bottom of FIG. 4B, wherein the two figures at the bottom of FIG. 4B uses the credible interval of 50%. According to an embodiment, the system 100 may determine the validity of a sensor in three categories: (i) a case when the sensed or measured sensor data is within a range between two control lines determined through the credible interval of 50% (the "50% range") may be managed as 'normal', (ii) a case when the sensed or measured sensor data is within a range between two control lines determined through the credible interval of 95% (the "95% range") while deviating from the 50% range may be managed as 'caution', and (iii) a case when the sensed or measured sensor data is deviating from the 95% range may be managed as 'risk'.

Meanwhile, according to the exemplary embodiment of the present disclosure, the validity of the sensor may be validated by combining the performance reduction model (may be referred to as "performance reduction index", "performance reduction degree", "aging index") of the facility with the Bayesian inference model. The performance reduction model of the facility is a model for measuring the performance reduction degree of the facility (e.g., gas turbine) in which the sensor is installed. Various known prediction techniques may be applied to obtain the performed reduction model.

According to an exemplary embodiment of the present disclosure, the setting unit 120 may modify the control line in consideration of the performance reduction index of the corresponding facility in which the sensor is installed. The storage unit 160 may store the updated information of the modified control line. For example, as the facility is aged, the control line may be updated gradually downward. "Modifying" of the control line may be referred to as "updating" or "adjusting" of the control line.

As described above, it is possible to move the control line over time in consideration of the reduction in performance of the facility, thereby reflecting the error of the sensor data due to the aging of the facility itself and reducing the possibility of incorrect validation of the validity of the sensor.

FIG. 5 is a diagram depicting a sensor validity validation technique that combines a Bayesian inference model and a performance reduction model according to an exemplary embodiment of the present disclosure.

First, the operation unit 110 obtains the posterior distributions of the parameters (the mean and the standard deviation) of the sensor data according to exemplary embodiments of the methods described herein (S510).

Further, the setting unit 120 sets the control line using the posterior distribution and HPD value of the parameter and stores the control line in the storage unit 160 (S520). According to an embodiment, the setting unit 120 can set and store the upper and lower control lines representing the attribute of the population based on the Bayesian inference technique.

While the control unit 130 may validate the validity of the sensor from the actual sensor data using the control line set in step S520, the control unit 130 according to an embodiment as shown in FIG. 5 may validate the validity of the sensor by applying the control line updated in consideration of the performance reduction degree of the gas turbine to the sensor data.

A calculation module for the performance reduction model of a facility such as the gas turbine may be included in the system 100 or the performance reduction model may be calculated and obtained from outside the system 100. If the calculation module is provided in the system 100, the operation unit 110 may perform the corresponding operation for calculation. Hereinafter, an exemplary embodiment wherein the calculated value or index for the performance reduction model is received from outside will be described.

The input unit 140 may receive the performance reduction index calculated from the performance reduction model of a facility, such as the gas turbine, from outside and deliver the performance reduction index to the setting unit 120 (S530). Then, the setting unit 120 modifies and updates the control line by applying the received performance reduction index to the control line to obtain the updated control line (S540). Further, the control unit 130 validates the validity of the sensor from the actual sensor data using the updated control line (S550).

FIG. 6 is a diagram explaining an example of updating, modifying, or adjusting the control line in combination of the performance reduction model according to an exemplary embodiment of the present disclosure.

In FIG. 6, Graph (x) shows the trend in which the performance reduction index gradually reduces over time due to the aging of the facility over time. Graph (y) shows the upper and lower control lines inferred using the posterior distribution and the HPD statistic through the Bayesian inference, respectively. Graph (y) is a case of not considering the performance reduction index due to the aging of the facility at all, and the upper control line (UCL) and the lower control line (LCL) are constantly applied over time.

Graph (z) is a diagram that depicts the updated, adjusted or modified upper and lower control lines by reflecting the trend of the performance reduction index of Graph (x). It may be seen that the updated upper and lower control lines gradually move downward over time. By using these updated upper and lower control lines, a risk of incorrectly determining that the sensor is invalid due to the aging of the facility itself may be avoided by reflecting the performance reduction index.

FIGS. 7A to 7C are exemplary diagrams showing results of testing the validity validation of the sensor through the technique according to an exemplary embodiment of the present disclosure.

FIG. 7A shows the prior distributions of the parameters set in any method according to an exemplary embodiment of the present disclosure. In the drawing according to an embodiment, it is assumed that both of the mean and the standard deviation that are the parameters follow the prior distributions.

FIG. 7B shows the posterior distributions of the parameters inferred in the Bayesian sampling technique using the prior distributions shown in FIG. 7A and the historical data of the sensor according to an embodiment. The arrangement of four figures corresponding to the posterior distributions in HDP plot in FIG. 7B is the same to the arrangement in FIG. 4B respectively, in which the figures on the left show the posterior distribution of the mean and the figures on the right show the posterior distribution of the standard deviation.

FIG. 7C shows the results of applying the upper control line and the lower control line determined from the posterior distributions of the mean and the standard deviation to the sensor data for determining the validity of the sensor by comparing the actually measured sensor data with the control lines, according to an exemplary embodiment.

The figures in FIG. 7C confirm that the sensor data initially exists within an interval between the upper and lower control lines and therefore, the sensor is determined to be in a normal state (state A). However, the state is changed at some point to be switched into an abnormal state (state B) wherein the sensor data deviates from the lower control line. In this case of a state B, it may be determined that the sensor is not valid and an abnormal alarm indicating the invalidity of the sensor may be activated.

According to embodiments of the present disclosure described above, it is possible to set the control limit based on the Bayesian inference and to validate the validity of the sensor from the actual sensor data more reliably using the control limit. Further, it is possible to apply the performance reduction degree of the facility to which the sensor is installed to update the control limit, thereby preventing a risk of incorrect determination of the sensor's invalidity caused by aging of the facility.

In other words, according to a present disclosure, it is possible to modify the control limit with time in consideration of the performance reduction index of the facility. This may solve a risk of incorrectly determining that the senor is invalid when the distortion and fluctuation of the sensor data are caused by the reduction in performance of the facility while the sensor itself is reliable and valid. This may also prevent the unnecessary repair or replacement of the sensor and the unnecessary process delay that may be caused by the incorrect validation.

While the present disclosure has been described with reference to the exemplary embodiment shown in the drawings, this is merely illustrative, and it will be understood by those skilled in the art that various modifications and equivalent other exemplary embodiments therefrom are available. Therefore, the true technical scope of the present disclosure should be determined by the technical spirit of the appended claims.

What is claimed is:

1. A method for controlling an operation of a sensor installed in a gas turbine based on assessing a validity of the sensor, the method comprising:
   providing the sensor and a processor connected to the sensor by a communication network;
   generating, by the processor, a Bayesian inference model outputting a posterior distribution of a parameter of sensor data using a Bayesian sampling technique based on a prior distribution of the parameter of the sensor data and measured historical data of the sensor;
   determining, by the processor, control lines of the sensor data comprising an upper control line and a lower control line based on a credible interval of the posterior distribution, wherein each of the upper control line and the lower control line is a value being compared to real-time sensor data;
   receiving, by the processor, a performance reduction index of the gas turbine acquired by measuring a performance reduction degree of the gas turbine;
   updating, by the processor, the upper and the lower control lines by reflecting a trend of the performance reduction index;
   receiving, by the processor, the real-time sensor data from the sensor;
   monitoring, by the processor, whether the real-time sensor data deviates from the control lines;
   determining, by the processor, that the sensor is generating correct data until the real-time sensor data deviates from the control lines to ensure an extended continuity of the gas turbine in which the sensor is operated;
   triggering an alarm via a speaker and a display in response to determining that the real-time sensor data deviates from the control lines; and
   repairing or replacing the sensor when the real-time sensor data deviates from the control lines,
   wherein the parameter includes a mean and a standard deviation,
   wherein the credible interval of the posterior distribution comprises a first credible interval and a second credible interval,
   wherein the first credible interval is established by:
   determining a median value of the posterior distribution of the mean; and
   establishing the first credible interval as a first predetermined percentage of a highest posterior density of the posterior distribution of the mean with respect to the median value of the posterior distribution of the mean,
   wherein second credible interval is established by:
   determining a median value of the posterior distribution of the standard deviation, and
   establishing the second credible interval as a second predetermined percentage of the highest posterior density of the posterior distribution of the standard deviation with respect to the median value of the posterior distribution of the standard deviation,
   wherein the determining of the control lines comprises:
   selecting a first lower boundary value denoted as a $\mu_L$ and a first upper boundary value denoted as a $\mu_u$ for the first credible interval;
   selecting a second lower boundary value denoted as a $\sigma_L$ and a second upper boundary value denoted as a $\sigma_u$ for the second credible interval;
   determining a lower control limit range by combining the $\mu_L$ with each of the $\sigma_L$ the $\sigma_u$, and an upper control limit range by combining the $\mu_u$ with each of the $\sigma_L$ and the $\sigma_u$; and
   determining the lower control line within the lower control limit range and the upper control line within the upper control limit range.

2. The method of claim 1,
   wherein the sensor comprises at least one of a temperature sensor and a rotation speed sensor that are configured to measure a temperature and a rotation speed of the gas turbine.

3. The method of claim 1,
wherein the lower control limit range is between the $\mu_L$ minus three times the $\sigma_L$ and the $\mu_L$ minus three times the $\sigma_U$, and the upper control limit range is between the $\mu_U$ plus three times the $\sigma_L$ and the $\mu_U$ plus three times the $\sigma_U$.

4. The method of claim 1,
wherein the determining of the validity of the sensor comprises determining that the sensor is valid if the real-time sensor data is between the upper control line and the lower control line, and determining that the sensor is not valid if the real-time sensor data is higher than the upper control line or lower than the lower control line.

5. The method of claim 1, wherein the performance reduction index, depicted as a function of time, diminishes in line with the aging process of the gas turbine.

6. The method of claim 5, wherein the updated control lines maintain that a subsequent upper control line is always smaller than a preceding upper control line and a subsequent lower control line is always smaller than a preceding lower control line.

7. The method of claim 1, wherein the credible interval of the posterior distribution further comprises a third credible interval and a fourth credible interval,
wherein the third credible interval represents a third predetermined percentage of a highest posterior density of the posterior distribution of the mean while the third predetermined percentage is smaller than the first predetermined percentage, and the fourth credible interval represents a fourth predetermined percentage of the highest posterior density of the posterior distribution of the standard deviation while the fourth predetermined percentage is smaller than the second predetermined percentage.

8. The method of claim 7, wherein the determining of the control lines further comprises:
selecting a third lower boundary value and a third upper boundary value for the third credible interval;
selecting a fourth lower boundary value and a fourth upper boundary value for the fourth credible interval;
determining an additional lower control line based on a combination of the third lower boundary value with each of the fourth lower boundary value and the fourth upper boundary value, and an additional upper control line based on a combination of the third upper boundary value with each of the fourth lower boundary value and the fourth upper boundary value; and
determining the validity of the sensor as a caution status if the real-time sensor data is between the additional lower control line and the lower control line or between the additional upper control line and the upper control line.

* * * * *